United States Patent Office 3,075,968
Patented Jan. 29, 1963

3,075,968
BENZOTHIAZEPINES
John Krapcho, New Brunswick, N.J., assignor to Olin Mathieson Chemical Corporation, New York, N.Y., a corporation of Virginia
No Drawing. Filed Sept. 18, 1961, Ser. No. 138,623
9 Claims. (Cl. 260—239.3)

This invention relates to new chemical compounds having valuable therapeutic properties and processes for the preparation thereof.

The therapeutically active compounds of this invention are bases of the general Formula I:

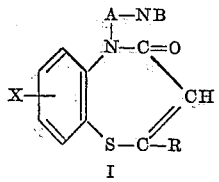

I and salts thereof, wherein X is hydrogen, lower alkyl, lower alkoxy, nitro, halo or trifluoromethyl; R is hydrogen, lower alkyl, an X-substituted phenyl lower alkyl, an X-substituted phenyl, furyl, thienyl, pyridyl or piperonyl; A is lower alkylene (preferably ethylene and propylene); and —NB is a basic nitrogen-containing radical of less than twelve carbon atoms. Among the suitable radicals represented by the symbol —NB are: amino; (lower alkyl)amino; di(lower alkyl)amino; (hydroxy-lower alkyl)amino; di(hydroxy-lower alkyl)amino; phenyl(lower alkyl)amino; N-(lower alkyl)-N-phenyl-(lower alkyl)amino; and saturated 5 to 6 membered monocyclic heterocyclic radicals of less than twelve carbon atoms, as exemplified by piperidino; (lower alkyl)-piperidino; di(lower alkyl)piperidino; (lower alkoxy)piperidino; 2, 3 or 4-piperidyl; 2, 3 or 4-(N-lower alkyl-piperidyl); pyrrolidino; (lower alkyl)pyrrolidino; di-(lower alkyl)pyrrolidino; (lower alkoxy)pyrrolidino; 2 or 3-pyrrolidyl; 2 or 3-(N-lower alkyl-pyrrolidyl); morpholino; (lower alkyl)-morpholino; thiamorpholino; (lower alkyl)thiamorpholino; di(lower alkyl)thiamorpholino; (lower alkoxy)thiamorpholino; piperazino; (lower alkyl)piperazino (e.g., N⁴-methyl-piperazino); di-(lower alkyl)piperazino; (lower alkoxy)piperazino; (hydroxy lower alkyl)piperazino (e.g., N⁴-2-hydroxyethyl-piperazino); (lower alkanoyloxy lower alkyl)piperazino; (e.g., N⁴-2-acetoxyethylpiperazino); and (lower alkoxy lower alkyl)piperazino. The terms "lower alkyl," "lower alkoxy," and "lower alkylene," as employed herein, include both straight and branched chain radicals of less than eight carbon atoms. The particularly preferred compounds are those wherein X is hydrogen or chloro, R is phenyl, A is ethylene or trimethylene and NB is di(lower alkyl)amino.

As to the salts, those coming within the purview of this invention include the acid-addition salts, particularly the non-toxic acid-addition salts, and the quaternary ammonium salts. Acids useful for preparing the acid-addition salts, include, inter alia, inorganic acids, such as the hydrohalic acids (e.g., hydrochloric and hydrobromic acid), sulfuric acid, nitric acid, boric acid and phosphoric acid, and organic acids, such as oxalic, tartaric, citric, acetic and succinic acid, theophylline and 8-chlorotheophylline. The quaternary ammonium salts include those formed with lower alkyl halides (e.g., methyl bromide, ethyl chloride and propyl iodide) and di-lower alkyl sulfates (e.g., dimethyl sulfate).

The compounds of this invention are therapeutically active compounds which are useful as tranquilizers and thus can be administered perorally in the same manner as Chlordiazepoxide in the treatment of irrational fears, anxiety and tension, the dosage for such treatment being adjusted for the activity of the particular compound employed.

The compounds of this invention can be prepared by condensing new intermediates of this invention of the Formula II:

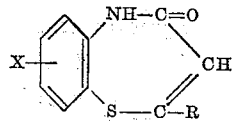

wherein X and R are as hereinbefore defined, with an aminoalkyl halide of the formula BN—A—Y, wherein BN— and A are as hereinbefore defined and Y is halide, particularly chloride. This reaction is preferably conducted by heating the reactants in the presence of a basic condensing agent, such as an alkali metal, an alkali metal amide (e.g., sodamide), or an alkali metal hydroxide. To form the acid-additional salts, the free base initially formed is interacted with at least one equivalent of the desired acid.

To prepare the starting materials (the compounds of Formula II) a 2-aminothiophenol of the Formula III:

III

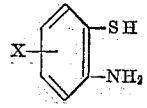

wherein X is as hereinbefore defined, is interacted with a propioloic acid derivative of the Formula IV:

(IV) 

wherein R is as hereinbefore defined.

Suitable reactants III include 2-aminobenzenethiol; 2-amino-(lower alkyl)benzenethiols, such as 2-aminotoluenethiols (e.g., 2-amino-4-toluenethiol), 2-amino-ethylbenzenethiols, 2-amino-n-propylbenzenethiols, 2-amino-isopropylbenzenethiols, 2-amino-butylbenzenethiols, and 2-aminohexylbenzenethiols; 2-amino-lower alkoxybenzenethiols, such as 2-amino-methoxybenzenethiols (e.g., 2-amino-4-methoxybenzenethiol), 2-amino-ethoxybenzenethiols, 2-amino-n-propoxybenzenethiols, and 2-amino-pentoxybenzenethiols; 2-amino-nitrobenzenethiols (e.g., 2-amino-n-nitrobenzenethiol); 2-amino-halo-benzenethiols, such as 2-amino-chlorobenzenethiols (e.g., 2-amino-4-chlorobenzenethiol), 2-amino-bromobenzenethiols and 2-amino-fluoro-benzenethiols; and 2-amino-trifluoromethyl-benzenethiols, such as 2-amino-4-trifluoromethylbenzenethiol.

Suitable reactants IV include propiolic acid; α-lower alkynoic acids of more than three carbon atoms (e.g., tetrolic acid, 2-pentynoic acid, 2-hexynoic acid, and 2-octynoic acid); ω-phenyl-α-lower alkyonic acids of more than two carbon atoms (e.g., phenylpropiolic acid, 4-phenyltetrolic acid, 5-phenyl-2-pentynoic acid, 6-phenyl-2-hexynoic acid, and 8-phenyl-2-octynoic acid; ω-(substituted phenyl)-α-lower alkynoic acids of more than two carbon atoms (e.g., m-nitro-phenylpropiolic acid, p-methyl-phenylpropiolic acid, p-ethyl - phenylpropiolic acid, p-methoxy-phenylpropiolic acid, p-ethoxy-phenyl-propiolic acid, p-trifluoromethylphenylpropiolic acid, p-chlorophenylpropiolic acid, 3-o-tolyl-tetrolic acid and 5-p-methoxyphenyl-2-pentynoic acid); piperonylpropiolic acid; (2-furyl)propiolic acid; (3-furyl)propiolic acid; (2-thienyl)propiolic acid; (3-furyl)propiolic acid; (2-pyridyl)propiolic acid; (3-pyridyl)propiolic acid; and (4-pyridyl)propiolic acid.

The following examples illustrate the invention (all temperatures being in centigrade):

EXAMPLE 1

*2-Phenyl-1,5-Benzothiazepin-4(5H)-One*

To 79.0 g. of phenylpropiolic acid is added 68.0 g. of 2-aminobenzenethiol. This mixture is cooled to control the exothermic reaction. The mixture is then heated slowly to 160° and then maintained at 160–180° for one hour. The solution is cooled to 100° and the resulting semi-solid treated with 250 ml. of warm acetonitrile. After cooling, the crystalline product weighs about 40 g., M.P. about 212–215°. Following recrystallization from dimethylforamide, the product melts at about 215–217°.

EXAMPLE 2

*5-(2-Dimethylaminoethyl)-2-Phenyl-1,5-Benzothiazepin-4-(5H)-One Hydrochloride*

A suspension of 6.9 g. of 2-phenyl-1,5-benzothiazepin-4(5H)-one in 200 ml. of toluene is added to a suspension of 1.1 g. of sodamide in 100 ml. of toluene. This mixture is warmed to 50° to obtain a solution, cooled to 30° and treated with a solution of 4.3 g. of 2-dimethylaminoethyl chloride in 31 ml. of toluene. This solution is heated at 60–70° for four hours, cooled and treated with 100 ml. of water. The organic phase is extracted with a solution of 10 ml. of conc. hydrochloric acid in 100 ml. of water. The aqueous phase is cooled and treated with a cold solution of 8 g. of sodium hydroxide in 20 ml. of water. The base is extracted three times with 200 ml. portions of ether and dried over magnesium sudfate. After evaporation of the solvent, the residual oil weighs about 7.5 g. A solution of 7.0 g. of this material in 20 ml. of absolute alcohol is treated with 3.6 ml. of 6 N alcoholic hydrogen chloride. Dilution of this solution with 200 ml. of ether gives about 7.5 g. of colorless product, M.P. about 216–218°. After crystallization from 300 ml. of acetonitrile, the colorless product melts at about 220–221°.

EXAMPLE 3

*5-(3-Dimethylaminopropyl)-2-Phenyl-1,5-Benzothiazepin-4(5H)-One Hydrochloride*

A suspension of 15.2 g. of 2-phenyl-1,5-benzothiazepin-4-(5H)-one in 400 ml. of toluene is added to a suspension of 2.4 g. of sodamide in 200 ml. of toluene. The mixture is warmed to 50° to obtain a solution, cooled to 30° and treated with 8.5 g. of 3-dimethylaminopropyl chloride. This mixture is refluxed for three hours and the product then isolated in the same manner as in Example 2 to give about 18 g. of the hydrochloride salt, M.P. about 159–161°. After crystallization from 40 ml. of acetonitrile, the colorless salt weighs about 15.5 g., M.P. about 162–164°.

EXAMPLE 4

*2-(4-Methylphenyl)-1,5-Benzothiazepin-4(5H)-One*

Substitution of 4-methylphenylpropiolic acid for phenylpropiolic acid in Example 1 yields 2-(4-methylphenyl)-1,5-benzothiazepin-4(5H)-one.

EXAMPLE 5

*5-(2-Dimethylaminoethyl)-2-(4-Methylphenyl)-1,5-Benzothiazepin-4(5H)-One Hydrochloride*

Following the procedure of Example 2 but substituting 7 g. of 2-(4-methyl-phenyl)-1,5-benzothiazepin-4(5H)-one for the 2-phenyl-1,5-benzothiazepin-4(5H)-one, 5-(2-dimethylaminoethyl)-2-(4-methylphenyl)-1,5-benzothiazepin-4(5H)-one hydrochloride is obtained.

EXAMPLE 6

*2-Phenyl-5-(2-Diethylaminoethyl)-1,5-Benzothiazepin-4(5H)-One Hydrochloride*

Following the procedure used in Example 2 but substituting an equivalent amount of 2-diethylaminoethyl chloride for the 2-dimethylaminoethyl chloride, 2-phenyl-5-(2-diethylaminoethyl)-1,5-benzothiazepin-4(5H) - one hydrochloride is obtained.

EXAMPLE 7

*2-Phenyl-5-[2-(1-Pyrrolidinyl)Ethyl]-1,5-Benzothiazepin-4(5H)-One Hydrochloride*

Following the procedure used in Example 2 but substituting an equivalent amount of 2-(1-pyrrolidinyl)ethyl chloride for the 2-dimethylaminoethyl chloride, 2-phenyl-5-[2-(1-pyrrolidinyl)ethyl] - 1,5 - benzothiazepin-4(5H)-one hydrochloride is obtained.

EXAMPLE 8

*2-Phenyl-5-[2(N-Methyl-N-Phenethylamino)Ethyl]-1,5-Benzothiazepin-4(5H)-One Hydrochloride*

Substitution of an equivalent quantity of 2-(N-methyl-N-phenethylamino)ethyl chloride for the 2-dimethylaminoethyl chloride in Example 2 gives 2-phenyl-5-[2-(N-methyl)-N-phenethyl-amino)ethyl] - 1,5 - benzothiazepin-4(5H)-one hydrochloride.

EXAMPLE 9

*2-Methyl-1,5-Benzothiazepin-4(5H)-One*

Following the procedure of Example 1 but substituting an equivalent amount of tetrolic acid for the phenylpropiolic acid, 2-methyl-1,5-benzothiazepin-4(5H)-one is obtained.

EXAMPLE 10

*2-Methyl-5-(2-Dimethylaminoethyl)-1,5-Benzothiazepin-4(5H)-One Hydrochloride*

Following the procedure of Example 2 but substituting an equivalent amount of 2-methyl-1,5-benzothiazepin-4(5H)-one for the 2-phenyl-1,5-benzothiazepin-4(5H)-one, 2-methyl - 5 - (2 - dimethylaminoethyl)-1,5-benzothiazepin-4(5H)-one hydrochloride is obtained.

EXAMPLE 11

*2-(4-Methoxyphenyl)-1,5-Benzothiazepin-4(5H)-One*

Folowing the procedure of Example 1 but substituting an equivalent amount of p-methoxyphenylpropiolic acid for the phenylpropiolic acid, 2-(4-methoxyphenyl)-1,5-benzothiazepin-4(5H)-one is obtained.

EXAMPLE 12

*2-(4-Methoxyphenyl)-5-(2-Dimethylaminoethyl)-1,5-Benzothiazepin-4(5H)-One Hydrochloride*

Following the procedure of Example 2 but substituting an equivalent amount of 2-(4-methoxyphenyl)-1,5-benzothiazepin-4(5H)-one for the 2-phenyl-1,5-benzothiazepin-4(5H)-one, 2 - (4 - methoxyphenyl)-5-(2-dimethylaminoethyl)-1,5-benzothiazepin - 4(5H) - one hydrochloride is obtained.

EXAMPLE 13

*2-(o-Methoxyphenyl)-5-(2-Dimethylaminoethyl)-1,5-Benzothiazepin-4(5H)-One Hydrochloride*

Following the procedure of Examples 1 and 2 but substituting 2-methoxyphenylpropiolic acid for the phenylpropiolic acid in Example 1, 2-(o-methoxyphenyl)-5-(2-dimethylaminoethyl)-1,5-benzothiazepin - 4(5H) - one is obtained.

EXAMPLE 14

*2-(p-Chlorophenyl)-5-(2-Dimethylaminoethyl)-1,5-Benzothiazepin-4(5H)-One Hydrochloride*

(a) *Preparation of 2-(p-chlorphenyl)-1,5-benzothiazepin-4(5H)-one.*—A mixture of 173 g. of p-chlorophenylpropiolic acid and 119 g. of 2-aminobenzenethiol is heated in an oil bath for two hours at 180–200°. After cooling, the product is purified by crystallization from dimethylformamide.

(b) *Preparation of 2-(p-chlorophenyl)-5-(2-dimethyl-* aminoethyl)-1,5-benzothiazepin-4(5H) - one hydrochloride.—8.7 g. of 2-(p-chlorophenyl)-1,5-benzothiazepin-4(5H)-one is reacted with 1.25 g. of sodamide and 3.8 g. of 2-dimethylaminoethyl chloride according to the procedure described in Example 2.

EXAMPLE 15

*2-(2-Furyl)-5-(2-Dimethylaminoethyl)-1,5-Benzothiazepin-4(5H)-One Hydrochloride*

(a) *Preparation of 2-(2-furyl)-1,5-benzothiazepin-4(5H)-one.*—A mixture of 42 g. of 2-furanpropiolic acid and 38 g. of 2-aminobenzenethiol is heated in an oil bath at 170–180° for one hour. After cooling, the product is purified by crystallization from acetonitrile.

(b) *Preparation of 2-(2-furyl)-5-(2-dimethylaminoethyl-1,5-benzothiazepin-4(5H)-one hydrochloride.*—12 g. of 2-(2-furyl)-1,5-benzothiazepin-4(5H)-one is reacted with 2.0 g. of sodamide and 6.1 g. of 2-dimethylaminoethyl chloride according to the procedure described in Example 2.

EXAMPLE 16

*2-(3-Piperonyl)-5-(2-Dimethylaminoethyl)-1,5-Benzothiazepin-4(5H)-One Hydrochloride*

Following the procedure of step (a) and (b) of Example 15 but substituting an equivalent quantity of piperonyl propiolic acid for the 2-furan propiolic acid in step (a), 2-(3-piperonyl)-5-(dimethylaminoethyl)-1,5-benzothiazepin-4(5H)-one hydrochloride is obtained.

Similarly, by following the procedure of Example 15 but substituting (4-pyridyl)propiolic acid, (2-pyridyl)propiolic acid and (2-thienyl)propiolic acid for the 2-furanpropiolic acid in step (a), 3-(4-pyridyl)-5-(2-dimethylaminoethyl)-1,5-benzothiazepin - 4(5H) - one hydrochloride, 2-(2-pyridyl)-5-(2-dimethylaminoethyl)-1,5-benzothiazepin-4(5H)-one hydrochloride, and 2-(2-thienyl)-5-(2 - dimethylaminoethyl)-1,5-benzothiazepin-4(5H)-one hydrochloride are obtained, respectively.

EXAMPLE 17

*5-(2-Morpholinoethyl)-2-Phenyl-1,5-Benzothiazepin-4(5H)-One Hydrochloride*

Following the procedure of Example 2 but substituting an equivalent amount of 2-morpholinoethyl chloride for the 2-dimethylaminoethyl chloride, 5-(2-morpholinoethyl)-2-phenyl-1,5-benzothiazepin-4(5H)-one hydrochloride is obtained.

EXAMPLE 18

*5-(2-Piperidinoethyl)-2-Phenyl-1,5-Benzothiazepin-4-One Hydrochloride*

Following the procedure of Example 2 but substituting an equivalent amount of 2-piperidinoethyl chloride for the 2-dimethylamionethyl chloride, 5-(2-piperidinoethyl)-2-phenyl-1,5-benzothiazepin-4(5H)-one hydrochloride is obtained.

EXAMPLE 19

*5-[3-(4-Methyl-1-Piperazinyl)Propyl]-2-Phenyl-1,5-Benzothiazepin-4(5H)-One Hydrochloride*

Following the procedure of Example 2 but substituting an equivalent amount of 1-methyl-4-(3-chloropropyl)-piperazine for the 2-dimethylaminoethyl chloride, 5-[3-(4 - methyl - 1-piperazinyl)-propyl]-2-phenyl-1,5-benzothiazepin-4(5H)-one hydrochloride is obtained.

EXAMPLE 20

*7-Chloro-2-Phenyl-5-(2-Diethylaminoethyl)-1,5-Benzothiazepin-4(5H)-One Hydrochloride*

Following the procedures of Examples 1 and 2 but substituting an equivalent amount of 2-amino-4-chlorothiophenol for the 2-aminobenzenethiol in Example 1, 7-chloro-2-phenyl-5-(2-diethylaminoethyl)-1,5-benzothiazepin-4(5H)-one hydrochloride is obtained.

EXAMPLE 21

*7-Methyl-2-Phenyl-5-(2-Diethylaminoethyl)-1,5-Benzothiazepin-4(5H)-One Hydrochloride*

Following the procedure of Examples 1 and 2 but substituting an equivalent amount of 2-amino-4-toluenethiol for the 2-aminobenzenethiol in Example 1, 7-methyl-2-phenyl-5-(2-diethylaminoethyl) - 1,5 - benzothiazepin-4-(5H)-one hydrochloride is obtained.

EXAMPLE 22

*7-Methoxy-2-Phenyl-5-(2-Diethylaminoethyl)-1,5-Benzothiazepin-4(5H)-One Hydrochloride*

Following the procedure of Examples 1 and 2 but substituting an equivalent amount of 2-amino-4-methoxybenzenethiol for the 2-aminobenzenethiol in Example 1, 7 - methoxy - 2 - phenyl - 5 - (2 - diethylaminoethyl)-1,5-benzothiazepin-4(5H)-one hydrochloride is obtained.

EXAMPLE 23

*7-(Trifluoromethyl)-2-Phenyl-5-(2-Diethylaminoethyl)-1,5-Benzothiazepin-4-One Hydrochloride*

Following the procedure of Examples 1 and 2 but substituting an equivalent amount of 2-amino-4-(fluoromethyl)thiophenol for the 2-aminobenzenethiol in Example 1, 7-(trifluoromethyl)-2-phenyl-5-(2-diethylaminoethyl)-1,5-benzothiazepin-4(5H)-one hydrochloride is obtained.

EXAMPLE 24

*1,5-Benzothiazepin-4(5H)-One*

Following the procedure of Example 1 but substituting an equivalent amount of propiolic acid for the phenylpropiolic acid, 1,5-benzothiazepin-4(5H)-one is obtained.

EXAMPLE 25

*5-(2-Dimethylaminoethyl)-1,5-Benzothiazepin-4(5H)-One Hydrochloride*

Following the procedure of Example 2 but substituting an equivalent amount of 1,5-benzothiazepin-4(5H)-one for the 2-phenyl-1,5-benzothiazepin-4(5H)-one, 5-(2-dimethylaminoethyl)-1,5-benzothiazepin-4(5H)-one hydrochloride is obtained.

EXAMPLE 26

*5-(2-Dimethylaminoethyl)-2-Phenyl-1,5-Benzothiazepin-4(5H)-One Methobromide*

A solution of 3.6 g. of 5-(2-dimethylaminoethyl)-2-phenyl-1,5-benzothiazepin-4(5H)-one hydrochloride in 30 ml. of water is treated with a solution of 1.5 g. of potassium carbonate in 10 ml. of water. The liberated base is extracted three times with 50 ml. portions of ether. The ether solutions are combined, dried over magnesium sulfate, filtered and the solvent evaporated on a steam bath. The residue is dissolved in 30 ml. of acetonitrile, cooled, and treated with 5 g. of methyl bromide. After standing for twelve hours, the mixture is diluted with ether and the crystalline product is filtered and dried.

This invention may be variously otherwise embodied within the scope of the appended claims.

What is claimed is:

1. A compound selected from the group consisting of bases of the formula

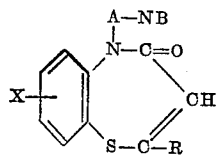

and pharmaceutically-acceptable acid-addition salts and quaternary ammonium salts formed with lower alkyl halide and di-lower alkyl sulfates thereof, wherein X is selected from the group consisting of hydrogen, lower alkyl, lower alkoxy, nitro, halo and trifluoromethyl; R is selected from the group consisting of hydrogen, lower alkyl, mono-X-substituted phenyl-lower alkyl, mono-X-substituted phenyl, furyl, thienyl, pyridyl and piperonyl; A is lower alkylene and NB is selected from the group consisting of amino, (lower alkyl)amino, di-(lower alkyl)amino, (hydroxy-lower alkyl)amino, di(hydroxy-lower alkyl)amino, phenyl(lower alkyl)amino, N-(lower alkyl)phenyl(lower alkyl)amino, piperidyl, (lower alkyl)piperidyl, di(lower alkyl)piperidino, (lower alkoxy)piperidino, pyrrolidyl, (lower alkyl)pyrrolidyl, di(lower alkyl)pyrrolidino, (lower alkoxy)pyrrolidino, morpholino, (lower alkyl)morpholino, thiamorpholino, (lower alkyl)thiamorpholino, di(lower alkyl)thiamorpholino, (lower alkoxy)thiamorpholino, piperazino, (lower alkyl)piperazino, di(lower alkyl)piperazino, (lower alkoxy)piperazino, (hydroxy-lower alkyl)piperazino, (lower alkanoyloxy lower alkyl)piperazino and (lower alkoxy lower alkyl)piperazino.

2. A compound of the formula

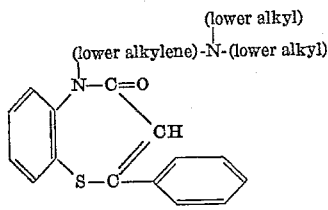

3. A pharmaceutically-acceptable acid-addition salt of the compound of claim 2.

4. A compound of the formula

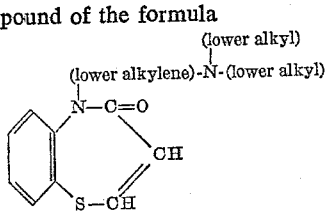

5. A pharmaceutically-acceptable acid-addition salt of the compound of claim 4.

6. A compound of the formula

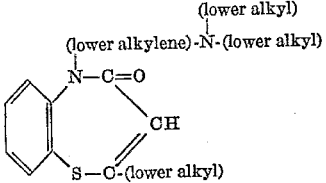

7. A pharmaceutically-acceptable acid-addition salt of the compound of claim 6.

8. A pharmaceutically-acceptable acid-addition salt of 5 - (2 - dimethylaminoethyl) - 2 - phenyl - 1,5 - benzothiazepin-4(5H)-one.

9. A pharmaceutically-acceptable acid-addition salt of 5 - (3 - dimethylaminopropyl) - 2 - phenyl - 1,5 - benzothiazepin-4(5H)-one.

References Cited in the file of this patent

UNITED STATES PATENTS 2,963,476    De Stevens    Dec. 6, 1960
2,989,528    Winthrop et al.    June 20, 1961

OTHER REFERENCES

Mills et al.: Jour. Chem. Soc., 1927, pages 2738–46.
Royals: Advanced Organic Chemistry, 1956, page 533.
Ried et al.: Chem. Berichte, volume 90, pages 2683–87 (1957).

UNITED STATES PATENT OFFICE
CERTIFICATE OF CORRECTION

Patent No. 3,075,968                          January 29, 1963

John Krapcho

It is hereby certified that error appears in the above numbered patent requiring correction and that the said Letters Patent should read as corrected below.

Column 3, line 29, for "sudfate" read -- sulfate --; column 5, Example 15, strike out second line of the title "cedure described in Example 2."; column 6, line 27, for "fluoro-" read -- trifluoro- --.

Signed and sealed this 29th day of October 1963.

(SEAL)
Attest:

ERNEST W. SWIDER                              EDWIN L. REYNOLDS

Attesting Officer                              Acting Commissioner of Patents